United States Patent
Brenner et al.

(10) Patent No.: US 10,507,560 B2
(45) Date of Patent: Dec. 17, 2019

(54) APPARATUS MOVABLE BY A COORDINATE MEASURING MACHINE FOR POSITIONING A MEASURING INSTRUMENT WITH RESPECT TO A WORKPIECE

(71) Applicant: Carl Zeiss Industrielle Messtechnik GmbH, Oberkochen (DE)

(72) Inventors: Kurt Brenner, Satteldorf (DE); Christian Bayer, Langenau (DE); Dieter Kaufmann, Heidenheim (DE); Otto Steinecker, Aalen (DE); Philipp Mayinger, Aalen (DE); Tobias Held, Noerdlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 120 days.

(21) Appl. No.: 15/934,386

(22) Filed: Mar. 23, 2018

(65) Prior Publication Data
US 2018/0272490 A1     Sep. 27, 2018

(30) Foreign Application Priority Data
Mar. 24, 2017 (DE) .......... 10 2017 106 425

(51) Int. Cl.
*B23Q 17/00* (2006.01)
*B23Q 17/09* (2006.01)
(Continued)

(52) U.S. Cl.
CPC ....... *B23Q 17/0966* (2013.01); *B23Q 17/003* (2013.01); *B23Q 17/2457* (2013.01);
(Continued)

(58) Field of Classification Search
CPC ............. B23Q 17/0966; B23Q 17/003; B23Q 17/2457; F16F 7/082; G01B 5/28
See application file for complete search history.

(56) References Cited

U.S. PATENT DOCUMENTS

| 6,922,905 B2 | 8/2005 | Szenger et al. |
| 8,001,859 B2 | 8/2011 | McMurtry et al. |
| (Continued) | | |

FOREIGN PATENT DOCUMENTS

| DE | 202014101900 U1 | 6/2014 |
| WO | 02054010 A1 | 7/2002 |

OTHER PUBLICATIONS

Catalog: GGB EP Solid Polymer Bearing Solutions; GGB Bearing Technology, 2013.

*Primary Examiner* — Jamel E Williams
(74) *Attorney, Agent, or Firm* — Falk Ewers; Ewers IP Law PLLC

(57) ABSTRACT

A positioning apparatus for positioning a tactile or optical roughness sensor, a probe or some other measuring instrument with respect to a workpiece can be secured to a movement device of a coordinate measuring machine. The positioning apparatus has a drive that produces a relative movement between two parts of the positioning apparatus, and an inhibiting device, which inhibits the relative movement between the two parts. For this purpose, the inhibiting device has a first friction element and a second friction element each having unlubricated friction surfaces. The friction surfaces are pressed against one another with a normal force that is not variable during the operation of the positioning apparatus. A coefficient of sliding friction that is less than 0.15 acts between the friction surfaces in the case of dryness and without lubrication. Typically, the inhibiting device is arranged in a flexspline of a strain wave gearing.

13 Claims, 2 Drawing Sheets

(51) Int. Cl.
*B23Q 17/24* (2006.01)
*G01B 21/04* (2006.01)
*G01B 5/28* (2006.01)
*G01B 3/00* (2006.01)
*F16F 7/08* (2006.01)

(52) U.S. Cl.
CPC .............. *F16F 7/082* (2013.01); *G01B 3/008* (2013.01); *G01B 5/28* (2013.01); *G01B 21/047* (2013.01); *B23Q 17/2471* (2013.01)

(56) References Cited

U.S. PATENT DOCUMENTS

| | | |
|---|---|---|
| 2005/0166413 A1 | 8/2005 | Crampton |
| 2009/0255139 A1 | 10/2009 | Wallace et al. |
| 2015/0061170 A1* | 3/2015 | Engel .................... B33Y 10/00 264/40.1 |
| 2017/0234676 A1* | 8/2017 | Haverkamp ........... G01B 5/008 33/503 |
| 2017/0299368 A1* | 10/2017 | Mayinger ................ G01B 5/28 |
| 2018/0073853 A1* | 3/2018 | Mayinger .............. G01B 11/30 |
| 2018/0094923 A1* | 4/2018 | Sagemueller .......... B23Q 16/10 |
| 2018/0180402 A1* | 6/2018 | Brenner ................ G01B 5/012 |
| 2018/0203119 A1* | 7/2018 | Kern .................... G01B 21/042 |
| 2018/0245905 A1* | 8/2018 | Brenner .................. G01B 5/28 |

\* cited by examiner

APPARATUS MOVABLE BY A COORDINATE MEASURING MACHINE FOR POSITIONING A MEASURING INSTRUMENT WITH RESPECT TO A WORKPIECE

CROSS REFERENCE TO RELATED APPLICATIONS

This application claims priority to German patent application DE 10 2017 106 425.7, filed Mar. 24, 2017, the entire content of which is incorporated herein by reference.

TECHNICAL FIELD

The invention relates to an apparatus configured to be movable by a coordinate measuring machine for positioning a measuring instrument relative to a workpiece. The measuring instrument can be, e.g., a tactile or optical roughness sensor or a probe that is secured to the positioning apparatus directly or via a measuring head of the coordinate measuring machine.

BACKGROUND

Coordinate measuring machines (CMMs) are often used for measurements on workpiece surfaces. A coordinate measuring machine usually includes a table that carries the workpiece to be measured, a probe or some other measuring instrument that is positioned directly above the workpiece, and a measuring head, which exerts defined actuating forces on the measuring instrument and measures forces transmitted from the measuring instrument to the measuring head. In general, coordinate measuring machines additionally include a movement device that moves the measuring head in three orthogonal movement directions x, y, and z relative to the table with high accuracy. However, coordinate measuring machines having a movement table that moves relative to a stationary measuring head are known. Insofar as reference is made hereinafter to a movement device, the relevant observations are correspondingly applicable to movement tables.

A coordinate measuring machine additionally includes an evaluation and control device, which controls the movements of the movement device and evaluates the measurement signals generated by the measuring head and possibly a measuring instrument secured thereto. For each of the three movement directions x, y, and z, the movement device has at least one transducer which returns information about the travel distances covered to the evaluation and control device. As a result, the position of a coupling of the movement device to which the measuring head is secured in an exchangeable fashion is known with high accuracy in all movement positions.

If the surface information to be determined by measurement includes in the Cartesian coordinates the workpiece surface, then the measuring instrument is usually a tactile probe. The latter, during the measurement, touches the surface with a predefined probing force generated by the measuring head. During probing, the probe is slightly deflected, which is likewise detected by the measuring head. If the position of the probe with respect to the coupling of the movement device is known, the Cartesian coordinates of the contact point can be accurately determined when the probing element contacts the workpiece surface. Instead of a tactile probe, it is also possible to use an optical probe, which measures the distance to the workpiece surface without contact. Such optical probes are based, e.g., on the principle of chromatic confocal imaging and are expedient primarily for the measurement of very soft workpieces.

If the roughness of workpiece surfaces is intended to be measured, the movement device of the coordinate measuring machine bears a roughness sensor, the latter often being a stylus instrument. A stylus instrument includes a movably mounted measuring arm, to the end of which a probe element, e.g., a diamond tip, is secured, which is deflected during the measurement by the contact with the workpiece surface. During the measurement, the probe element is linearly moved perpendicularly to the deflection direction of the probe element with the aid of a feed unit and in this way is guided along a line over the workpiece surface to be measured. Accurate measurement values can be obtained only if the deflection direction of the probe element extends exactly perpendicularly to the surface to be measured. Therefore, the probe element has to be aligned very accurately relative to the workpiece not only with regard to its Cartesian coordinates, but also with regard to its angular orientation in space.

The same correspondingly also applies to roughness sensors that operate without contact, for instance white light sensors that carry out point measurement or areal measurement. Sensors of this kind have also to be aligned very accurately relative to the workpiece to prevent the measurement results from being corrupted.

In modern production sequences, the workpieces have to be manufactured with such small tolerances that continuous process monitoring is indispensable. Moreover, a problem arising ever more frequently is that the workpieces whose surfaces are intended to be measured in an automated fashion have very complex shapes. By way of example, an engine block of an internal combustion engine has a multiplicity of bores with different internal diameters, numerous undercuts and irregular recesses at which there are surfaces to be measured. Conventional coordinate measuring machines with their usually very high-volume movement devices are generally unable to position a measuring instrument in the openings or recesses of an engine block in such a way that a measurement can be performed there.

Modern measuring systems which in some instances are also suitable for continuous process monitoring therefore often include a positioning apparatus arranged between the movement device of the coordinate measuring machine and a probe, a roughness sensor or some other measuring instrument. The positioning apparatus has the task of positioning the measuring instrument directly above the surface to be measured.

Such positioning apparatuses can include, for example, a rotary-pivoting joint, as described in U.S. Patent Application Publication No. 2009/0255139 A2. With the aid of this known positioning apparatus, a measuring instrument can be rotated about a vertical axis and additionally pivoted about a horizontal axis to position the measuring instrument optimally relative to the workpiece surface. In that case the measuring instrument is additionally also rotatable about a third axis of rotation.

Another positioning apparatus having three axes of rotation is known from DE 20 2014 101 900 U1.

In general, the positioning apparatus is not secured directly to the movement device of the coordinate measuring machine, but rather to the measuring head carried by the movement device. However, measuring systems in which the measuring head is arranged between the positioning device and the measuring instrument are also known. The measuring instrument is not secured to the positioning device directly, but rather indirectly via the measuring head.

Positioning apparatuses of this type have to position the measuring instrument very accurately. An inaccurate positioning of the measuring instrument carried by the positioning apparatus is manifested directly in a lower measurement accuracy of the entire measuring system. In order to achieve a high positioning accuracy, both the mechanical construction and the control of the drives of the positioning apparatus have to meet very stringent requirements.

In positioning apparatuses of this type, an electrical servomotor is usually used for each degree of freedom of movement. The servomotor together with a displacement sensor or rotary encoder are part of a closed-loop control circuit. By comparing the controlled variable determined by the sensor or encoder with the reference variable (setpoint value), the controller calculates the current that is intended to be applied to the servomotor. Besides a position sensor or angle encoder, the closed-loop control circuit normally contains an additional tachometer, which measures the (rotational) speed of one of the parts. In this way, speeds can be determined more rapidly than as it would be possible by differentiating the position information with respect to time.

In general, the closed-loop control has the effect that current is applied to the servomotor even when the parts to be driven are not moving. In this way, the servomotor generates holding forces required to keep the relevant parts of the positioning apparatus stationary.

What is disadvantageous about this type of closed-loop control, however, is that electric current flows even in the quiescent state. The electric current results in local heating of the positioning apparatus in the vicinity of the respective servomotor. This necessitates additional measures to compensate the resulting thermally governed expansion of parts of the positioning apparatus or to take the resulting thermally governed expansion of the parts of the positioning apparatus into account computationally.

U.S. Pat. No. 8,001,859 B2 discloses a positioning apparatus which, in order to solve this problem, contains a mechanical friction brake that locks the parts of the positioning apparatus that are movable relative to one another as soon as the parts are intended to no longer move. The servomotors can then be deenergized, as a result of which less heat is generated.

What is disadvantageous about this known positioning apparatus, however, is that it can assume two different operating states depending on whether the brake was actuated. As a result, two calibration processes are necessary in order to calibrate the measuring system. Moreover, such a brake requires an additional actuator mechanism and corresponding control lines, thereby occupying additional structural space. What is of importance for the positioning apparatuses, however, is that they are as small and lightweight as possible, to be able to introduce the measuring instrument or the measuring head even into narrow openings or other poorly accessible locations.

SUMMARY

It is an object of the invention to provide a positioning apparatus for positioning a measuring instrument relative to a workpiece, which makes it possible to achieve very high positioning accuracies in conjunction with a small and lightweight design.

According to one aspect of the invention, the object is achieved by providing a positioning apparatus for positioning a measuring instrument relative to a workpiece, including a first coupling, by which the positioning apparatus can be secured to a movement device of a coordinate measuring machine. The positioning apparatus additionally includes a second coupling, by which the measuring instrument can be secured to the positioning apparatus. A drive of the positioning apparatus is configured to produce a relative movement between two parts of the positioning apparatus, wherein rotational, translational or both rotational and translational degrees of freedom can be assigned to said relative movement. According to this aspect of the invention, the positioning apparatus includes an inhibiting device configured to inhibit the relative movement between the two parts. For this purpose, the inhibiting device includes a first and a second friction element, which each have unlubricated friction surfaces. The friction surfaces are pressed against one another with a normal force that is not variable during the operation of the positioning apparatus. A coefficient of sliding friction that is less than 0.15 acts between the friction surfaces in the case of dryness and without lubrication.

Instead of using a brake, as in the related art, according to an aspect of the disclosure, the relative movement between the two parts that are movable relative to one another is inhibited permanently and non-variably. The inhibiting device generates an additional resistance to movement that can otherwise be achieved at best using high-viscosity lubricants. However, the additional resistance to movement that can be achieved using such high-viscosity lubricants is too small in most cases and moreover has the disadvantage that it is not constant over time. Both momentary temperature changes and degradation phenomena—established over long periods of time—of the lubricants can result in undesired changes in the viscosity and thus in the resistance to movement. Moreover, an inhibiting system using high-viscosity lubricants requires regular maintenance. By contrast, the inhibiting device according to the aspect of the disclosure including the unlubricated friction surfaces is maintenance-free.

The resistance to movement that is generated by the inhibiting device according to the aspect of the disclosure has the effect that the positioning apparatus becomes stiffer overall and movements of the parts that are movable relative to one another are damped to a greater extent. The additional damping counteracts the formation of oscillations which can be excited by movements of the positioning apparatus, probing forces during the measuring process or by externally introduced vibrations. Since the positioning device according to the aspect of the disclosure is less susceptible to oscillations, it can be controlled more easily. The greater resistance to movement that has to be overcome by the drive additionally has the effect that the controller required for the drive can be operated at a better operating point.

Owing to the increased resistance to movement, moreover, the gravitational force affects the movements of the parts of the positioning apparatus to a lesser extent. By way of example, if a vertically upright arm of the positioning apparatus is shifted by 90° to the side, the joint of the arm is loaded differently. An increased resistance to movement that is brought about by the inhibiting device can prevent such a load change from resulting in slipping of the drive or the joint and thus in an undesired position change.

The resistance to movement that is brought about by the inhibiting device can have a magnitude such that, while the parts are at rest, no electric current or only an electric current of significantly reduced intensity flows through the motor of the drive. The fact of whether the motor can be completely deenergized depends not only on the orientation of the parts with respect to the gravitational force, but also on the weight of the measuring instrument. In many cases, it has proved to be expedient if a small residual current is applied to the motor of the drive even while parts are at rest.

Since less or no electric current is consumed when the movable parts are at rest, the evolution of heat is also lower. On the other hand, owing to the higher resistance to movement, the motor of the drive requires more electric current while the parts are moving. However, since the times of movement are generally significantly shorter than the times of rest, overall less current is consumed and hence less heat is generated.

In the case of measurement tasks during which the movable parts of the positioning apparatus undergo a great deal of movement, the current consumption and thus the evolution of heat may be higher. That can generally be taken into account by an improved temperature compensation. The positioning apparatus can be provided with strain gauges or similar transducers, for example, which can be used to measure temperature-induced deformations. The deformations thus measured are then taken into account in the closed-loop control of the drives, as is known per se in the related art.

A further positive effect of the higher resistance to movement that is brought about by the inhibiting device is that the relationship between the current applied to the motor of the drive and the speed of the relative movement of the two parts with respect to one another has a linear relationship. This also results in a simplification of the closed-loop control of the drive. The less stringent requirements made of the closed-loop control make it possible, in turn, to dispense with an additional tachometer, as a result of which structural space can be saved and the outlay for additional signal lines can be reduced. Owing to the simplified closed-loop control, it suffices for the speed to be determined by differentiating with respect to time a spatial coordinate detected by a sensor or encoder.

One feature of the inhibiting device according to an aspect of the disclosure is the very low coefficient of sliding friction that acts between the friction surfaces. For coefficients of sliding friction of less than 0.15, and typically of less than 0.125, the difference between sliding friction and static friction becomes less and less. As a result, the static friction caused by the inhibiting device is only slightly greater than the sliding friction caused by the inhibiting device. If the portions of the static friction and sliding friction that are caused by the inhibiting device are added to the portions that are caused by the other parts of the drive, the difference between the static friction and the sliding friction of the overall system thus does not change significantly. The difference is responsible for the fact that undesired "jerking" can occur during start-up if the control of the drive does not reduce the drive moment rapidly enough during the transition between static friction and sliding friction. However, since the inhibiting device does not significantly increase the difference, faster controllers do not have to be used with the use of the inhibiting device according to the aspect of the disclosure.

In order to be able to generate a sufficiently large resistance to movement despite the small coefficient of sliding friction, the normal force used to press the friction surfaces against one another has to be comparatively high. By way of example, a compression spring or some other elastic element can be used to generate the normal force. By prestressing the elastic element, it is possible to establish the normal force and hence the resistance to movement that is generated by the inhibiting device during assembly. It goes without saying that different elastic elements can also be installed. The permissible tolerances in the case of the normal force are large, however, for which reason it is generally not necessary to set the normal force to a precisely predefined value during assembly by an adjusting screw or by choosing a specific compression spring.

Low coefficients of sliding friction can be achieved, for example, if one of the friction surfaces is made of steel and the other friction surface is made of plastic. Even with these materials, however, the friction surfaces should be very smooth and should have an average surface roughness Ra where $0.5 \leq Ra \leq 1$.

A particularly uniform inhibiting effect can be achieved if the friction surfaces are planar. In principle, however, cylindrical friction surfaces are also suitable.

In one exemplary embodiment, the first friction element is moved by the drive, while the second friction element is stationary. Such an inhibiting device can be constructed in a similar manner to a disk brake, except that the resistance to movement is not variable, in contrast to a brake.

In one exemplary embodiment, the drive includes a motor and a strain wave gearing, which connects a drive shaft and an output shaft to one another. The inhibiting device is arranged in a canister-shaped flexspline of the strain wave gearing. The canister-shaped and elastic flexspline is normally empty or, in the case of high loading, filled at least partly with a lubricating grease. Since high movement speeds are generally not required in the case of the positioning apparatus according to an aspect of the disclosure, the rotational speeds and moments that occur in the strain wave gearing are also comparatively low. As a result, no lubricating grease is required, and the interior of the canister-shaped flexspline can be used for the arrangement of the inhibiting device. In this way, the inhibiting device can be integrated in a space-saving manner into a structural space present anyway in the positioning apparatus.

In the case where the inhibiting device is arranged in a strain wave gearing, it is possible, for example, for the first friction element to be rotatably secured to the drive shaft and the second friction element to the output shaft. However, the torques between the drive shaft and the output shaft are not transmitted via the inhibiting device, but rather via the actual gearing. Preferably, the second friction element is secured to the output shaft for conjoint rotation, but in an axially movable manner, and is pressed against the first friction element by a compression spring. Such an arrangement is very compact and can readily be arranged in the flexspline of a strain wave gearing.

Even better properties are obtained if the first friction element is secured to the drive shaft or is formed by the drive shaft, and the inhibiting device includes a third friction element and a fourth friction element, which each have unlubricated friction surfaces, which are pressed against one another with a normal force that is not variable during the operation of the positioning apparatus. A coefficient of sliding friction that is less than 0.15 also acts between the friction surfaces of the third and fourth friction elements in the case of dryness and without lubrication. In this case, the fourth friction element is secured to the output shaft for conjoint rotation or is formed by the output shaft. The second friction element and the third friction element are connected to one another for conjoint rotation and are arranged jointly between the first friction element and the second friction element. An elastic pressure element is arranged between the second friction element and the third friction element, the elastic pressure element pressing the second friction element against the first friction element and simultaneously pressing the third friction element against the fourth friction element.

The inhibiting device thus includes two pairs of friction surfaces which are rotatable with respect to one another, but which are coupled to one another. Upon start-up, the friction surfaces of that pair which has the lower coefficient of static friction begin to rotate relative to one another. The other pair of friction surfaces generally still adhere to one another. In this way, it is ensured that the pair having the lower coefficient of static friction "asserts" itself. A low coefficient of static friction of the inhibiting device has a favorable effect in turn on the start-up behavior of the two parts to be moved with respect to one another.

Preferably, the resistance to movement that is generated by the inhibiting device at any arbitrary point in time during a relative movement between the two parts is at least of the same magnitude as, and typically has a magnitude at least 1.5 times that of, the resistance to movement that is generated jointly by all the other parts of the drive at said point in time. In other words, the inhibiting device according to the aspect of the disclosure leads to an at least two-fold increase in the resistance to movement between the two parts that are movable with respect to one another, which is a measure of sluggishness.

The positioning apparatus can include for example a rotary-pivoting joint and/or a multi-membered articulated arm. However, more complex joints such as ball-and-socket joints are also suitable. For linear drives, too, the inhibiting device according to the aspect of disclosure is advantageously useable without restriction.

Subject of the present disclosure is also a positioning apparatus for positioning a measuring instrument relative to a workpiece. The positioning apparatus includes a first coupling, by which the positioning apparatus is able to be secured to a movement device of a coordinate measuring machine, and a second coupling, by which a measuring instrument is able to be secured to the positioning apparatus. The positioning apparatus furthermore includes a drive configured to produce a relative movement between two parts of the positioning apparatus. The drive includes a motor and a strain wave gearing, which connects a drive shaft and an output shaft to one another, and an inhibiting device configured to inhibit the relative movement between the two parts. The strain wave gearing has a pot-shaped flexspline, in which the inhibiting device is arranged.

BRIEF DESCRIPTION OF THE DRAWINGS

The invention will now be described with reference to the drawings wherein.

DESCRIPTION OF EXEMPLARY EMBODIMENTS

1. Coordinate Measuring Machine

Figure 1:
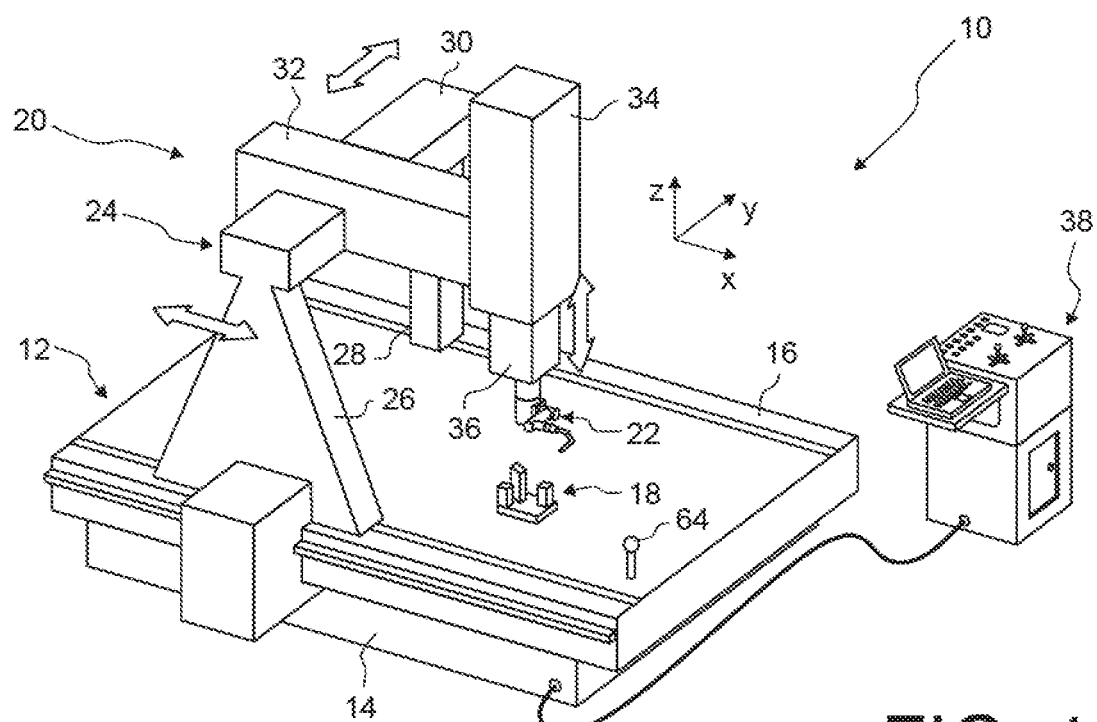
FIG. 1 shows a perspective illustration of a coordinate measuring machine with a positioning apparatus according to an exemplary embodiment of the disclosure.

FIG. 1 shows a perspective illustration of a coordinate measuring machine 10. The coordinate measuring machine 10 includes a table 12 with a base 14 and a plate 16 made of hard rock. The plate 16 serves for receiving a workpiece 18 with the aid of a workpiece holder (not illustrated). In this exemplary embodiment, it is assumed that the measurement task includes measuring the roughness of a surface 19 of the workpiece 18 in a spatially resolved manner.

The table 12 carries a movement device 20, by which a measuring head 21 and a positioning apparatus 22 secured thereto can be positioned relative to the table 12 with high accuracy. In the illustrated exemplary embodiment, the movement device 20 has a gantry-type configuration and includes a gantry 24, which is mounted with two feet 26, 28 at the edges of the table 12, and which is movable along the table 12 in the horizontally extending x-direction driven by a motor. A cantilever 32 is mounted on a gantry crossbeam 30, which interconnects the two feet 26, 28, in such a way that the cantilever can be moved driven by a motor along the longitudinal direction of the gantry crossbeam 30, i.e., in the likewise horizontally extending y-direction, as indicated by a double-headed arrow. A measurement carrier 36 is received in a vertically aligned receptacle 34 of the cantilever 32 and is movable in a motor-driven manner along the vertically extending z-direction.

The measuring head 21, which carries the positioning apparatus 22, is secured to the measurement carrier 36 in an exchangeable manner. In the illustrated exemplary embodiment, the measuring head 21 includes three spring parallelograms arranged one behind another, such that the positioning apparatus 22 is mounted displaceably in one coordinate direction via each spring parallelogram. In order to detect the deflection, each spring parallelogram is assigned a transducer in the form of a plunger coil magnet. In addition, each spring parallelogram has a measurement force generator in the form of a plunger coil drive, by which forces can be exerted on the positioning apparatus 22 in the respective coordinate direction. In this way the measuring head 21 can exert defined actuating forces along orthogonal directions x, y, and z, while the transducers of the measuring head 21 measure the forces acting on the positioning apparatus 22 along the directions. Further details in this respect can be gathered from WO 02/054010 A1, the disclosure of which in this respect is incorporated hereby by reference in the subject matter of the present application.

The space that can be reached by the measurement carrier 36 as a result of travel movements along the directions x, y, and z is of the order of magnitude of approximately 2 m$^3$ in the illustrated exemplary embodiment, and even significantly larger workpieces 18 can be measured compared with what is illustrated in FIG. 1.

For each of the three directions x, y, and z, the movement device 20 has at least one transducer which returns information about the travel distances covered to an evaluation and control device 38. As a result, the position of the measurement carrier 36 is known with high accuracy in all movement positions.

The evaluation and control device 38 controls the movements of the movement device 20 and evaluates the measurement values generated by a roughness sensor 44 secured to the positioning apparatus 22. The evaluation also includes the computational correction of the measurement values supplied by the positioning apparatus 22. Inter alia, static and dynamic influences of the movement device 20 and of the positioning apparatus 22 can thus be taken into account.

2. Positioning Apparatus

Figure 2:
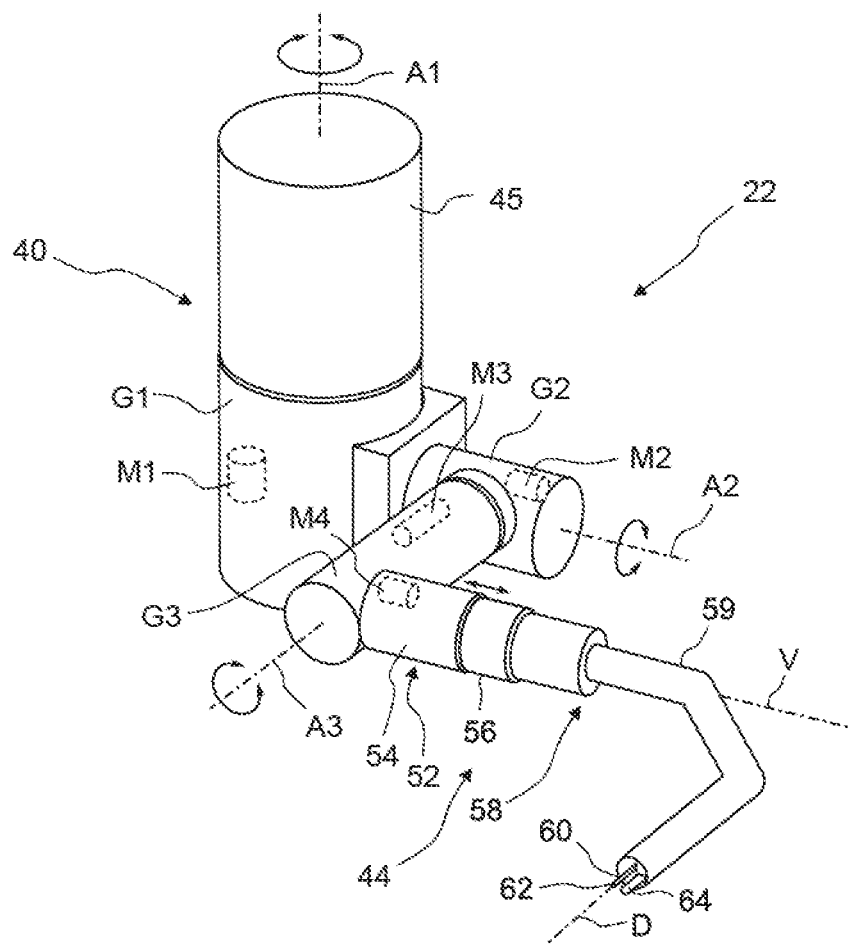
FIG. 2 shows the positioning apparatus shown in FIG. 1 in an enlarged measuring apparatus in an enlarged illustration.

As is discernible in the enlarged illustration in FIG. 2, the positioning apparatus 22 substantially includes an arm 40 having a plurality of members movably connected to one another. A feed unit 52 of a roughness sensor 44 is secured to the arm 40, the roughness probe 58 of the roughness sensor being movable along an advance direction V.

That member of the arm 40 which is illustrated at the top in FIG. 2 is referred to hereinafter as connection member 45 and has a first coupling, by which the positioning apparatus 22 is able to be secured to the measuring head 21, which for its part is carried by the movement device 20 of the coordinate measuring machine 10. The coupling has for this purpose, in a manner known per se, alignment elements, securing elements and electrical or optical connection elements, by which it is possible to produce a signal connection between the connection member 45 and the measuring head 21.

The arm 40 has a first arm portion G1, which is arranged below the connection member 45. The first arm portion G1 is rotatable relative to the connection member 45 about a first axis of rotation A1 and includes a first drive to this end. The first drive is only indicated schematically in FIG. 2 and is denoted by M1. A second arm portion G2 is rotatable relative to the first arm portion G1 about a second axis of rotation A2 with the aid of a second drive M2, with the second axis of rotation A2 extending perpendicular to the first axis of rotation A1. A third arm portion G3 is rotatable relative to the second arm portion G2 with the aid of a third drive M3, to be precise about a third axis of rotation A3 which extends perpendicular to the second axis of rotation A2. Here, the arm 40 is designed such that the second axis of rotation A2 intersects both the first axis of rotation A1 and the second axis of rotation A3.

From the end of the third arm portion G3, the feed unit 52 of the roughness sensor 44 extends radially outward. In the illustrated exemplary embodiment, the feed unit 52 is permanently connected to the third arm portion G3 and includes a drive unit 54, and also a coupling member 56 having a second coupling. The coupling member 56 is linearly displaceable relative to the drive unit 54 along a linear guide in the advance direction V with the aid of a drive M4, as indicated by a double-headed arrow in FIG. 2. The advance direction V extends perpendicular to the third axis of rotation A3, and it is co-rotated with the latter. Via the second coupling, the roughness probe 58 is secured to the coupling member 56 in an exchangeable manner. In other exemplary embodiments, the entire roughness sensor 44 is secured to the third arm portion G3 in a releasable manner, the latter having a suitable coupling for this purpose.

The roughness probe 58 has a housing 59, which is angled twice by 45° in each case in the illustrated exemplary embodiment. A probe arm 60 having a probe tip 62, which can be a diamond needle, for example, projects from an opening at the end side of the housing 59. Furthermore, a skid 64 is secured to the housing 59, said skid bearing against the surface 19 of the workpiece 18 during the measurement.

In preparation for a roughness measurement, the movement device 20 of the coordinate measuring machine 10 brings the positioning apparatus 22 firstly into a position in proximity to the workpiece 18. In order to carry out the roughness measurement at the desired location on the surface 19, the positioning apparatus 22 positions the roughness sensor 44 with high accuracy relative to the workpiece 18. To that end, the motors M1, M2, and M3 of the positioning apparatus 22 are driven by the evaluation and control device 38 such that the probe tip 62 of the roughness sensor 44 can finally settle at the desired location at the surface 19 of the workpiece 18. In the context of positioning, at least one of the members G1, G2, and G3 is rotated about the assigned axis of rotation A1, A2, or A3.

During placement of the probe tip 62, the skid 64 of the roughness sensor 44 also makes contact bearing against the surface 19. In this case, the measuring head 21 generates the probing force which is required for the roughness measurement and with which the probe tip 62 bears on the surface 19 of the workpiece 18. During the measurement, the motor M4 of the feed unit 54 is actuated to move the roughness probe 58 along the advance direction V. The skid 64 slides over the surface 19 of the workpiece 18 and undulations or steps on the surface lead to deflections of the roughness sensor 44 along the deflection direction D, which are picked up and measured by the measuring head 21.

During the movement process V, the measuring arm 60 with the probe tip 62 secured thereto is simultaneously deflected by relatively small channels or grooves on the surface 19. The deflections of the measuring arm 60 along the deflection direction D are detected by a transducer arranged in the housing 59. The measurement signals generated by the transducer are communicated to the evaluation and control device 38 via the couplings of the positioning apparatus 22 and via the coordinate measuring machine 10. Finally, the roughness profile of the surface 19 is derived from the measurement signals.

3. Inhibiting Device—First Exemplary Embodiment

During positioning, the motors M1, M2, and M3 of the positioning apparatus 22 drive shafts via gearings and thus bring the above-described rotation of the members G1, G2, G3 about the axes of rotation A1, A2, A3. In this case, friction in the bearings of the shafts, in the gearings and in other parts which participate in the relative movement of two adjacent members generates a moment of resistance that has to be overcome by the respective motor. Since the moment of resistance is comparatively small, without an additionally generated moment of resistance, the positioning apparatus 22 overall would have only low stiffness and could only weakly damp oscillations that occur.

To increase the stiffness and to better damp oscillations, the positioning device 22 thus has, for each of the drives, an inhibiting device that increases the moment of resistance.

A first exemplary embodiment of an inhibiting device is explained below with reference to FIG. 3. The schematic illustration shown therein indicates on the right the motor M1 that enables the first member G1 to be rotated about the first axis of rotation A1 relative to the coupling member 45. Via a drive shaft 70, the motor M1 acts on a gearing 72, which drives an output shaft 74. In the exemplary embodiment illustrated in FIG. 3, the output shaft 74 carries a disk-shaped first friction element 84, which is made of steel and has plane-parallel friction surfaces 86a, 86b. A friction surface 88a and 88b, respectively, of a substantially parallelepipedal second friction element 90a and 90b, respectively, which is made of plastic, engages on each of the friction surfaces 86a, 86b. The two friction elements 90a, 90b are pressed against the two friction surfaces 86a, 86b of the first friction element 84 with the aid of compression springs 92a and 92b, respectively. In this case, the compression springs 90a, 90b are supported on a clip like structure 94. The inhibiting device 76 thus has a construction similar to that of a disk brake, except that the action of the second friction elements 90a, 90b on the first friction element 84 is not variable.

Figure 3:
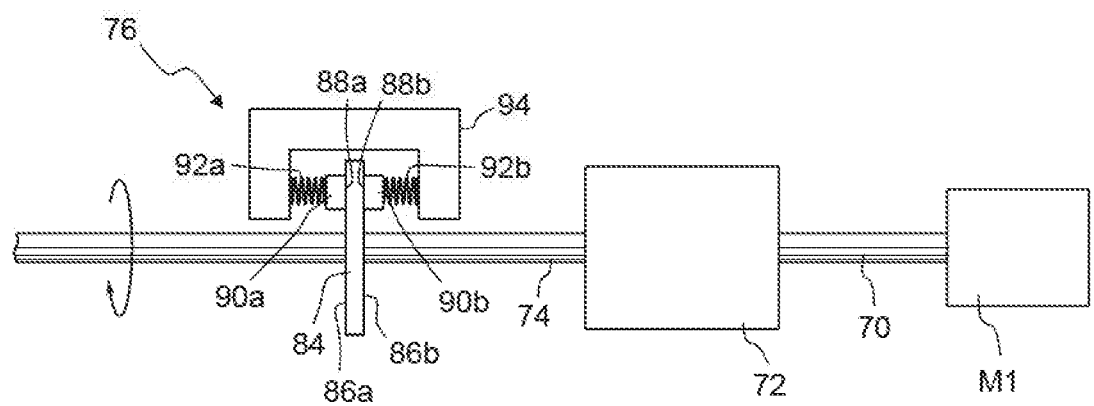
FIG. 3 shows a first exemplary embodiment of an inhibiting device; the inhibiting device being constructed in a manner of a disk brake.

In the exemplary embodiment illustrated in FIG. 3, the friction surfaces 86a, 88a and 86b, 88b bearing against one another each have an average surface roughness Ra of approximately 0.8. Owing to the material pairing used of steel/plastic and the low average surface roughness Ra, a very small coefficient of sliding friction acts between the touching friction surfaces, which coefficient of sliding friction is approximately 0.1 and generally should be less than 0.15 and typically less than 0.125.

In order to bring about a sufficiently strong damping, the inhibiting device 76 generates a moment of resistance which is at least of the same magnitude as, and preferably has a magnitude of at least 1.5 times that of the moment of resistance that is generated by all the other parts of the drive as illustrated in FIG. 3. Owing to the small coefficient of sliding friction, the normal force generated by the compression springs 92*a*, 92*b* must therefore be large. What force is required in an individual case depends not only on the moment of resistance that is generated by all the other parts of the drive as illustrated in FIG. 3, but also on the weight of the members G1 to G3 and of the measuring instrument guided thereby.

Since the friction surfaces 86*a*, 88*a* and 86*b*, 88*b*, respectively bearing against one another, slide on one another without lubrication, the inhibiting device 76 is largely maintenance-free. Moreover, it occupies only little structural space and generates an approximately constant moment of resistance even over a very long period of time.

The moment of resistance generated by the inhibiting device 76 is somewhat higher upon start-up because at the beginning of a rotational movement of the output shaft 74 the static friction still acts between the friction surfaces 86*a*, 88*a* and 86*b*, 88*b*, respectively bearing against one another. In the case of material pairings having low sliding friction, however, the difference with respect to the coefficient of static friction is generally relatively small. As a result, the inhibiting device 76 does not appreciably increase the difference between the moments of resistance that are caused by the static friction and the sliding friction in the entire drive. The controller used for controlling the motor can therefore readily compensate for the change in the moment of resistance upon start-up by correspondingly rapid reduction of the drive moment.

Inhibiting devices of the same type can of course also be used for the drives of the other members G2 and G3.

4. Inhibiting Device—Second Exemplary Embodiment

Figure 4:
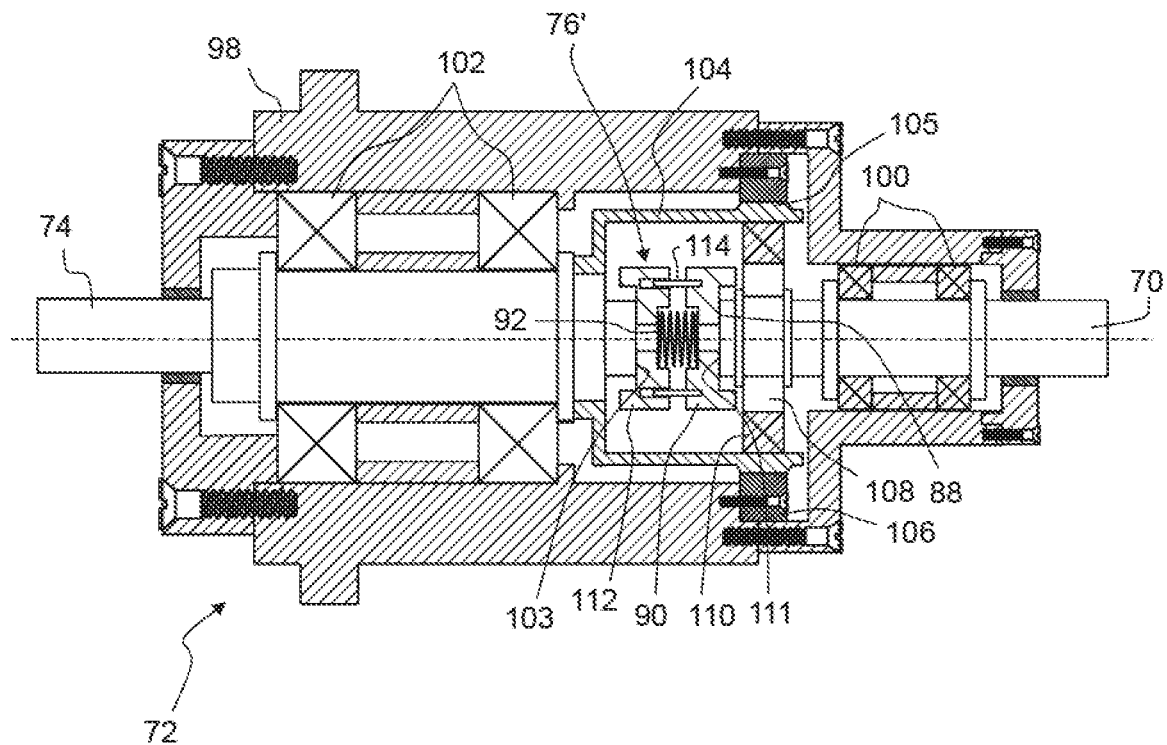
FIG. 4 shows a second exemplary embodiment of an inhibiting device; the inhibiting device being integrated into the flexspline of a strain wave gearing.

FIG. 4 shows, in a schematic sectional illustration, an exemplary embodiment in which an inhibiting device 76' is integrated into the gearing 72. In this case, the inhibiting device 76' uses structural space that is otherwise unused, and therefore, the inhibiting device 76' does not occupy additional structural space in the positioning apparatus 22.

In the exemplary embodiment illustrated in FIG. 4, the gearing 72 is a strain wave gearing, which connects the drive shaft 70 to the output shaft 74. The drive shaft 70 is mounted in a multipartite housing 98 by drive bearings 100, and the output shaft 74 by output bearings 102. A flexspline 104 is secured, for conjoint rotation, to the end face 103 of the output shaft 74 that faces the drive shaft 70. The flexspline is made of a flexible, but wear-resistant material and is substantially pot-shaped. In the vicinity of its opening, the flexspline 104 is provided with an external toothing 105, which meshes with an internal toothing provided on a housing-fixed external ring 106. The internal toothing has fewer teeth than the external toothing 105.

An elliptical disk 108 secured on the drive shaft 70 for conjoint rotation presses the flexspline 104 from the inside by the external toothing 105 thereof against the internal toothing of the external ring 106. In order to reduce the friction between the disk 108 and the flexspline 104, an elastic ball bearing 110 is located therebetween. If the disk 108 is caused to rotate by the drive shaft 70, it successively presses mutually opposite portions of the flexspline 104 against the external toothing 105. Since the latter has more teeth than the internal toothing, the flexspline with the output shaft 74 secured thereto rotates at a lower rotational speed than the drive shaft 70. Since the gearing 72 in this respect is known from the related art, further explanations concerning the construction and function will be dispensed with at this juncture.

The inhibiting device 76' is arranged in the interior of the pot-shaped flexspline 104 of the gearing 72. In the exemplary embodiment illustrated in FIG. 4, a first friction element is formed by the drive shaft 70. The end face 111 of the drive shaft 70, which is made of steel and which has an average surface roughness Ra of approximately 0.8, forms a friction surface in this case.

A second friction element is formed by a disk 90 composed of plastic and having a central hole and two concentric recesses. The friction surface 88 facing the drive shaft has an average surface roughness Ra of approximately 0.8.

A third friction element 112 is embodied just like the second friction element 90 and is merely arranged mirror-symmetrically with respect thereto.

A fourth friction element is formed by the output shaft 74, the end face of which is likewise made of steel and has an average surface roughness Ra of approximately 0.8.

The second friction element 90 and the third friction element 112 are connected to one another for conjoint rotation via pins 114. The concentric recesses of the friction elements 90, 112 facing one another define an interspace, in which a compression spring 92 is arranged. The latter presses the second friction element 90 against the drive shaft 70 and the third friction element 116 against the output shaft 74. The two friction elements 90, 112 thus rub against the end sides 111, 103 of the drive and output shafts 70 and 74, respectively, and generate the desired uniform moment of resistance in this way.

If the drive shaft 70 is set in motion by the motor M1, a drive moment acts between the drive shaft 70 and the output shaft 74, which drive moment must firstly overcome a moment of resistance which is generated by static friction and to which the inhibiting device 76' with its two pairs of friction surfaces also contributes. Starting from a specific drive moment, the pair of friction surfaces having the lower static friction begin to rotate relative to one another. During the further rotation, the other pair of friction surfaces generally still adhere to one another owing to the somewhat greater static friction. In this way, it is ensured that from the two pairs of friction surfaces, the smaller moment of resistance dominates the transition to sliding friction.

Instead of using the drive shaft 70 and the output shaft 74 as friction elements, additional disks made of steel can also be secured to the shaft ends for conjoint rotation, the disks functioning as friction elements and bearing against the disks 90, 112 composed of plastic.

It is understood that the foregoing description is that of the exemplary embodiments of the invention and that various changes and modifications may be made thereto without departing from the spirit and scope of the invention as defined in the appended claims.

What is claimed is:

1. A positioning apparatus for positioning a measuring instrument relative to a workpiece, the positioning apparatus comprising:
   a first coupling configured to secure the positioning apparatus to a movement device of a coordinate measuring machine;
   a second coupling configured to secure the measuring instrument to the positioning apparatus;
   a drive configured to produce a relative movement between two parts of the positioning apparatus;
   an inhibiting device configured to inhibit the relative movement between the two parts, the inhibiting device including a first friction element and a second friction element, each of the first and second friction elements having an unlubricated friction surface;
   the friction surfaces being pressed against one another with a normal force, the normal force being constant during an operation of the positioning apparatus; and
   a coefficient of sliding friction acting between the friction surfaces in the case of dryness and without lubrication being less than 0.15.

2. The positioning apparatus of claim 1, wherein the coefficient of sliding friction is less than 0.125.

3. The positioning apparatus of claim 1, wherein one of the friction surfaces is made of steel and another of the friction surface is made of plastic.

4. The positioning apparatus of claim 1, wherein each of the friction surfaces has an average surface roughness Ra of between $0.5 \leq Ra \leq 1$.

5. The positioning apparatus of claim 1, wherein the first friction element is movable by the drive and the second friction element is stationary.

6. The positioning apparatus of claim 1, further comprising:
   a drive shaft; and
   an output shaft, wherein:
   the drive includes a motor and a strain wave gearing,
   the strain wave gearing connects the drive shaft and the output shaft to one another, and
   the strain wave gearing has a pot-shaped flexspline, in which the inhibiting device is arranged.

7. The positioning apparatus of claim 6, wherein
   the first friction element is at least one of secured to the drive shaft or formed by the drive shaft,
   the inhibiting device includes a third friction element and a fourth friction element each having unlubricated friction surfaces, each being pressed against one another with a constant normal force during the operation of the positioning apparatus,
   a coefficient of sliding friction of less than 0.15 acts between the friction surfaces of the third and fourth friction elements in the case of dryness and without lubrication, and
   the fourth friction element is at least one of secured to the output shaft for conjoint rotation or formed by the output shaft,
   the second friction element and the third friction element are connected to one another for conjoint rotation and are arranged jointly between the first friction element and the fourth friction element, and
   an elastic pressure element is arranged between the second friction element and the third friction element, the elastic pressure element pressing the second friction element against the first friction element and the third friction element against the fourth friction element.

8. The positioning apparatus of claim 1, wherein a resistance to movement generated by the inhibiting device at any arbitrary point in time during a relative movement between the two parts is at least of the same magnitude as a resistance to movement that is generated jointly by all the other parts of the drive at said point in time.

9. The positioning apparatus of claim 8, wherein a moment of resistance that is generated by the inhibiting device at any arbitrary during a relative movement between the two parts has a magnitude at least 1.5 times that of a sum of all the moments of resistance that are generated by all the other parts of the drive at said point in time.

10. The positioning apparatus of claim 1, further comprising a rotary-pivoting joint.

11. The positioning apparatus of claim 1, further comprising a multi-membered articulated arm.

12. A positioning apparatus for positioning a measuring instrument relative to a workpiece, the positioning apparatus comprising:
   a first coupling configured to secure the positioning apparatus to a movement device of a coordinate measuring machine;
   a second coupling configured to secure the measuring instrument to the positioning apparatus; and
   a drive configured to produce a relative movement between two parts of the positioning apparatus, the drive including a motor and a strain wave gearing, which connects a drive shaft and an output shaft to one another, and the strain wave gearing has a pot-shaped flexspline, in which the inhibiting device is arranged.

13. The positioning apparatus of claim 12, wherein
   the first friction element is at least one of secured to the drive shaft or formed by the drive shaft;
   the inhibiting device includes a third friction element and a fourth friction element, the fourth friction element being at least one of secured to the output shaft for conjoint rotation or formed by the output shaft;
   the second friction element and the third friction element are connected to one another for conjoint rotation and are arranged jointly between the first friction element and the fourth friction element, and
   an elastic pressure element is arranged between the second friction element and the third friction element, the elastic pressure element pressing the second friction element against the first friction element and the third friction element against the fourth friction element.

* * * * *